United States Patent
Fakoorian et al.

(10) Patent No.: US 12,446,016 B2
(45) Date of Patent: Oct. 14, 2025

(54) JOINT BANDWIDTH PART SWITCHING FOR A GROUP OF UES

(71) Applicant: Apple Inc., Cupertino, CA (US)

(72) Inventors: Seyed Ali Akbar Fakoorian, San Diego, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 17/949,028

(22) Filed: Sep. 20, 2022

(65) Prior Publication Data

US 2023/0101464 A1 Mar. 30, 2023

Related U.S. Application Data

(60) Provisional application No. 63/248,260, filed on Sep. 24, 2021.

(51) Int. Cl.
*H04W 72/0453* (2023.01)
*H04L 5/14* (2006.01)
(Continued)

(52) U.S. Cl.
CPC ......... *H04W 72/0453* (2013.01); *H04L 5/14* (2013.01); *H04L 27/2607* (2013.01); *H04W 72/23* (2023.01)

(58) Field of Classification Search
CPC ......... H04L 27/2602; H04L 27/26025; H04L 27/2607; H04L 5/0064; H04L 5/0073; H04L 5/0092
See application file for complete search history.

(56) References Cited

U.S. PATENT DOCUMENTS

2019/0132824 A1* 5/2019 Jeon ............... H04W 28/20
2021/0051701 A1* 2/2021 Fakoorian ........ H04L 1/1896
(Continued)

FOREIGN PATENT DOCUMENTS

CN    111149416 X    5/2020
CN    112243598    1/2021
(Continued)

OTHER PUBLICATIONS

Extended European Search Report for European Patent Application No. 22197245.8; Feb. 6, 2023.
(Continued)

*Primary Examiner* — Zhensheng Zhang
(74) *Attorney, Agent, or Firm* — Kowert, Hood, Munyon, Rankin & Goetzel, P.C.

(57) ABSTRACT

A base station may transmit a message to a group of user equipments (UEs), directing the UEs to change their respective bandwidth parts (BWPs). For each of the UEs of the group, the message may include a corresponding new BWP. In response to receiving the message, each UE of the group may switch to the corresponding new bandwidth part. The message may be transmitted as part of a group common DCI message. The UE may signal its required minimum guard band size to the base station. Alternatively, the UE may respond to the message with an acknowledgement message. The base station may configure a virtual common downlink BWP for the group of UEs. The UEs drop transmission/reception repetitions that occurs during its BWP switch delay period.

15 Claims, 11 Drawing Sheets

(51) Int. Cl.
*H04L 27/26* (2006.01)
*H04W 72/23* (2023.01)

(56) References Cited

U.S. PATENT DOCUMENTS

2021/0152418 A1* 5/2021 Abdelghaffar ....... H04B 7/0602
2021/0194663 A1* 6/2021 Abotabl ............... H04B 17/327

FOREIGN PATENT DOCUMENTS

| | | |
|---|---|---|
| CN | 112335317 | 2/2021 |
| CN | 112601277 | 4/2021 |
| WO | 2020181285 | 9/2020 |
| WO | 2021158480 | 8/2021 |

OTHER PUBLICATIONS

Office Action for KR 10-2022-0120756; Feb. 7, 2025.
Lenovo "Summary of email discussion [100b-e-NR-unlic-NRU-DL_Signals_and_Channels-02] on available RB set indication and COT duration" 3GPP TSG RAN WG1 #100bis R1-2002787, May 1, 2020.
Office Action for CN 2022111682884; Jun. 28, 2025.
Samsung "Enhancements to Resource Multiplexing for NR IAB" 3GPP TSG RAN WG1 #106-e R1-2106907; Aug. 16, 2021.

* cited by examiner

JOINT BANDWIDTH PART SWITCHING FOR A GROUP OF UES

PRIORITY INFORMATION

This application claims priority to U.S. provisional patent application Ser. No. 63/248,260, entitled "Joint Bandwidth Part Switching for a Group of UEs," filed Sep. 24, 2021, which is hereby incorporated by reference in its entirety as though fully and completely set forth herein.

FIELD

The present disclosure relates to the field of wireless communication, and more particularly, to mechanisms for managing cross-link interference (CLI) by causing a group of user equipments (UEs) to switch their respective bandwidth parts.

DESCRIPTION OF THE RELATED ART

Cross-link interference (CLI) may occur when a first UE (referred to as an aggressor UE) transmits to a base station while a second UE (referred to as a victim UE) is receiving from the base station, especially if the transmit frequency of the first UE is too close to the reception frequency of the second UE. Thus, there exists a need for mechanisms capable of managing cross link interference.

SUMMARY

In some embodiments, a base station may assign bandwidth parts (BWPs) for victim UEs and aggressor UEs based on one or more minimum guard bands (or minimum guard band sizes) provided by the victim UEs. The base station may signal the assigned bandwidth parts to the respective UEs via downlink messaging. For each victim UE, the downlink BWP assigned to the victim UE may be separated from any aggressor UE's uplink BWP by at least the victim UE's minimum guard band size.

In some embodiments, a base station may transmit a message that directs a group of UEs to switch their BWPs. This message may be transmitted as part of group common downlink control information (GC-DCI).

In some embodiments, a base station may transmit a reference sub-carrier spacing (SCS) to the group of UEs, enabling each UE of the group to determine a common value of a minimum BWP switch delay. A mapping between SCS and BWP switch delay may, e.g., be configured by the network, or defined by a wireless communication standard.

In some embodiments, a base station may receive one or more acknowledgements from one or more respective UEs, where each acknowledgement is transmitted by the corresponding UE in response to receiving the group common DCI.

In some embodiments, the base station may configure a virtual common downlink BWP for a group of UEs, wherein the virtual common downlink BWP includes the uplink BWPs and downlink BWPs of the UEs in said group. The group includes one or more victim UEs and one or more aggressor UEs. The virtual common downlink BWP may be signaled to the UEs in the downlink message, e.g., in a group common DCI message.

In some embodiments, a user equipment may drop repetitions of a transmission/reception that occur within a BWP switch delay period. (The transmission/reception may have started on an existing BWP, e.g., prior to initiation of the BWP switch, or prior to reception of a joint BWP switch message from the base station.) The user equipment may perform one or more repetitions of the transmission/reception after the UE switches to the new bandwidth part (e.g., a bandwidth part indicated by the joint BWP switch indication).

In some embodiments, a base station may transmit a message to a group of user equipments (UEs), directing the UEs to change their respective bandwidth parts (BWPs). For each of the UEs of the group, the message may indicate a corresponding new BWP. The base station may determine the new BWPs so that the uplink transmit frequency of one UE does not approach too closely to the downlink reception frequency of another UE in the same cell, and thereby avoid cross-link interference.

In some embodiments, a non-transitory memory medium may store program instructions. The program instructions, when executed by processing circuitry, may cause the processing circuitry to perform any of the method embodiments described above.

In some embodiments, a user equipment (UE) device may include a radio subsystem; processing circuitry coupled to the radio subsystem; and memory storing program instructions. The program instructions, when executed by the processing circuitry, may cause the UE device to perform any of the method embodiments described above.

In some embodiments, a non-transitory memory medium may store program instructions. The program instructions, when executed by processing circuitry, may cause the processing circuitry to perform any of the method embodiments described above.

In some embodiments, a base station may include a radio subsystem; processing circuitry coupled to the radio subsystem; and memory storing program instructions. The program instructions, when executed by the processing circuitry, may cause the base station to perform any of the method embodiments described above.

A method is disclosed for operating a first user equipment (UE). The UE may determine a first minimum frequency guard band value for use between frequency resources associated with downlink communications between the first UE and a base station, and frequency resources associated with uplink communications between a second UE and the base station. The UE may transmit to the base station an indication of the first minimum frequency guard band value. The UE may receive from the base station a downlink bandwidth part (BWP) allocation for the first UE accommodating the first minimum frequency guard band value.

In some scenarios, the frequency resources allocated for the uplink communications and the frequency resources allocated for the downlink communications may be located within a frequency band reserved for time division duplex (TDD) communications.

In some scenarios, the indication of the first minimum frequency guard band value may be transmitted within a UE capability information message of the first UE.

In some scenarios, the first minimum frequency guard band value may be determined as a minimum frequency guard band value to be allocated between an edge tone of a downlink BWP allocated to the first UE and an edge tone of an uplink BWP allocated to the second UE.

In some scenarios, the first minimum frequency guard band value may be determined as a minimum frequency guard band value to be allocated between an edge tone of downlink resources allocated to the first UE and an edge tone of uplink resources allocated to the second UE.

In some scenarios, the first minimum frequency guard band may be determined based on at least one of: a priority of a downlink channel to be received by the first UE; a type of downlink signal to be received by the first UE; or a type of downlink channel to be received by the first UE.

In some scenarios, the UE may determine a second minimum frequency guard band value for use between frequency resources associated with downlink communications between the first UE and a base station, and frequency resources associated with uplink communications between a second UE and the base station, wherein the first minimum frequency guard band value is for use when downlink communications for the first UE have a first set of characteristics, and wherein the second minimum frequency guard band value is for use when downlink communications for the first UE have a second set of characteristics. In some scenarios, the first set of characteristics and the second set of characteristics differ in at least one of: channel priority; signal type; or channel type.

In some scenarios, the UE may receive from the base station a group common downlink control information (GC-DCI) message indicating a change of downlink BWP allocation for the first UE and a change of uplink BWP allocation for the second UE, wherein the changed allocations accommodate the first minimum frequency guard band value.

In some such scenarios, the UE may, in response to determining that the change of downlink BWP allocation for the first UE increases the downlink BWP allocation for the first UE, provide to the base station an acknowledgement that the first UE has received the GC-DCI message.

In some such scenarios, the UE may receive from the base station an indication of a reference sub-carrier spacing (SCS) value for use in determining a minimum switching delay associated with the change of downlink BWP allocation, wherein the reference SCS is different from a SCS of the first UE. In some scenarios, the indication of the reference SCS may be received in the GC-DCI message.

In some scenarios, the GC-DCI may include an indication of a PUCCH resource for use in indicating an acknowledgement that the GC-DCI has been received.

In some scenarios, the UE may, in response to determining that a repetition occasion of a downlink transmission from the base station falls within a minimum switching delay associated with the change of downlink BWP allocation, drop all subsequent repetitions of the downlink transmission.

In some scenarios, the UE may, in response to determining that a first repetition occasion of a downlink transmission from the base station falls within a minimum switching delay associated with the change of downlink BWP allocation, drop the first repetition of the downlink transmission during the minimum switching delay; and receive a second repetition of the downlink transmission following the minimum switching delay.

In some scenarios, the UE may, in response to determining that a repetition occasion of a downlink transmission from the base station falls within a minimum switching delay associated with the change of downlink BWP allocation, delay reception of the repetition until after the minimum switching delay.

Systems and devices are also disclosed for implementing the preceding methods.

A base station of a wireless communication network is disclosed, the base station comprising memory storing software instructions and processing circuitry configured to execute the software instructions. Executing the instructions may cause the base station to receive an indication of a first minimum frequency guard band value for use between frequency resources associated with downlink communications between a first user equipment (UE) and the base station, and frequency resources associated with uplink communications between a second UE and the base station. The instructions may further cause the base station to allocate downlink resources for the first UE and uplink resources for the second UE, wherein the downlink resources are separated in frequency from the uplink resources by at least the first minimum frequency guard band, wherein the downlink resources and the uplink resources are located within a frequency band reserved for time division duplex (TDD) communications. The instructions may further cause the base station to transmit an indication of the allocated downlink resources to the first UE; and transmit an indication of the allocated uplink resources to the second UE.

In some scenarios, the processing circuitry may be configured to execute the software instructions to receive an indication of a second minimum frequency guard band value for use between frequency resources associated with downlink communications between a first UE and the base station, and frequency resources associated with uplink communications between a second UE and the base station, wherein the first minimum frequency guard band value is for use when downlink communications for the first UE have a first set of characteristics, and wherein the second minimum guard band value is for use when downlink communications for the first UE have a second set of characteristics. Allocating the downlink resources and the uplink resources separated in frequency by at least the first minimum frequency guard band may be in response to determining that the downlink communications for the first UE have the first set of characteristics.

In some scenarios, the processing circuitry is configured to execute the software instructions to provide to the first UE and the second UE a group common downlink control information (GC-DCI) message indicating a change of downlink resources allocated for the first UE and a change of uplink resources allocated for the second UE, wherein the changed allocations accommodate the first minimum frequency guard band value.

BRIEF DESCRIPTION OF THE DRAWINGS

A better understanding of the present subject matter can be obtained when the following detailed description of the preferred embodiment is considered in conjunction with the following drawings.

Figure 1:
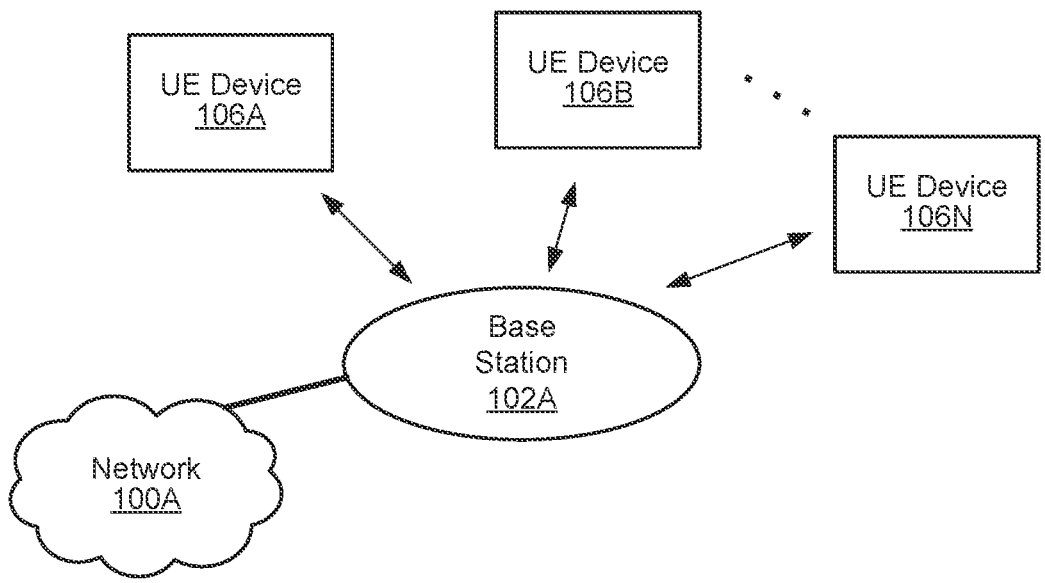
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CA: Carrier Aggregation
CC: Component Carrier
CSI: Channel State Information
CSI-RS: CSI Reference Signal
DCI: Downlink Control Information
DL: Downlink
DRB: Data Radio Bearer
eNB (or eNodeB): Evolved Node B, i.e., the base station of 3GPP LTE
EN-DC: E-UTRA—NR Dual Connectivity
E-UTRA: Evolved Universal Terrestrial Radio Access
FR n: Frequency Range n
gNB (or gNodeB): next Generation NodeB, i.e., the base station of 5G NR
HARQ: Hybrid Automatic Repeat Request
LTE: Long Term Evolution
LTE-A: LTE-Advanced
MAC: Medium Access Control
MAC-CE: MAC Control Element
MIMO: Multiple-Input Multiple-Output
NR: New Radio
NR-DC: NR Dual Connectivity
NSA: Non-Standalone
NW: Network
PBCH: Physical Broadcast Channel
PDCCH: Physical Downlink Control Channel
PDCP: Packet Data Convergence Protocol
PDU: Protocol Data Unit
PDSCH: Physical Downlink Shared Channel
PRB: Physical Resource Block
QAM: Quadrature Amplitude Modulation
RAN: Radio Access Network
RAT: Radio Access Technology
RLC: Radio Link Control
RLM: Radio Link Monitoring
RNTI: Radio Network Temporary Identifier
RRC: Radio Resource Control
RRM: Radio Resource Management
RS: Reference Signal
SN: Sequence Number
SR: Scheduling Request
SSB: Synchronization Signal/PBCH Block
TB: Transport Block
UE: User Equipment
UL: Uplink
UMTS: Universal Mobile Telecommunications System

Terms

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones) or satellite phones, portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station configured to wirelessly communicate with user equipment (UE) devices and to provide access to a communication network for the UE devices. In some embodiments, a base station may be installed at a fixed location and used to communicate as part of a wireless communication network. In other embodiments, a base station may be a moving (or moving) station, e.g., a satellite or high-altitude platform or airborne platform or vehicle borne platform or wearable platform.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
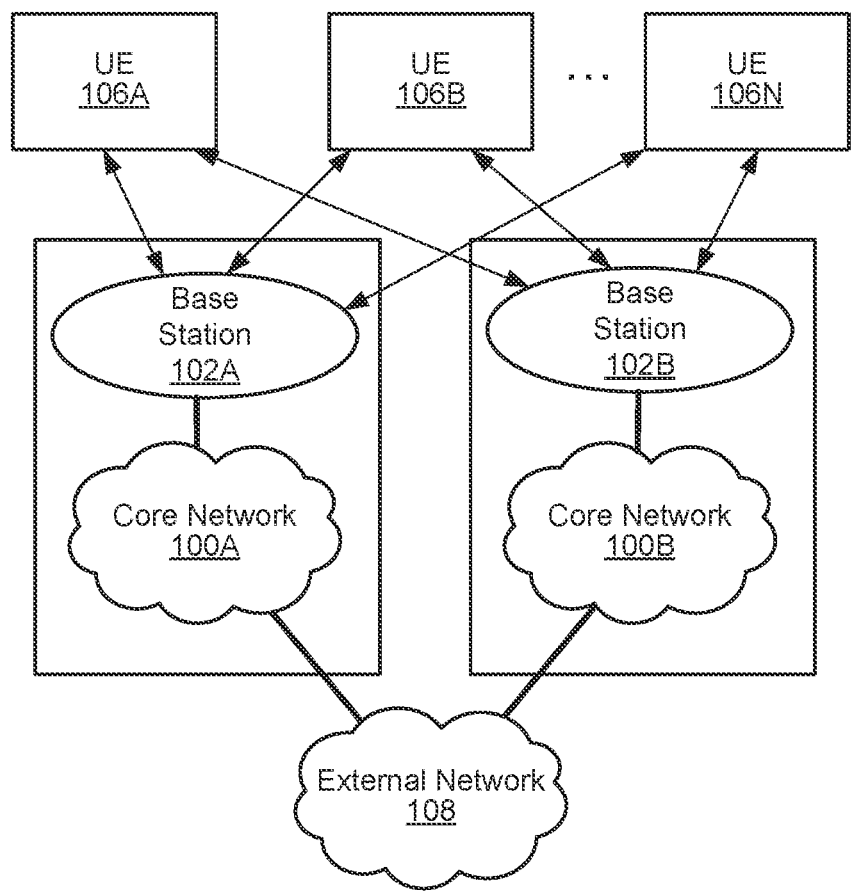
Figure 3:
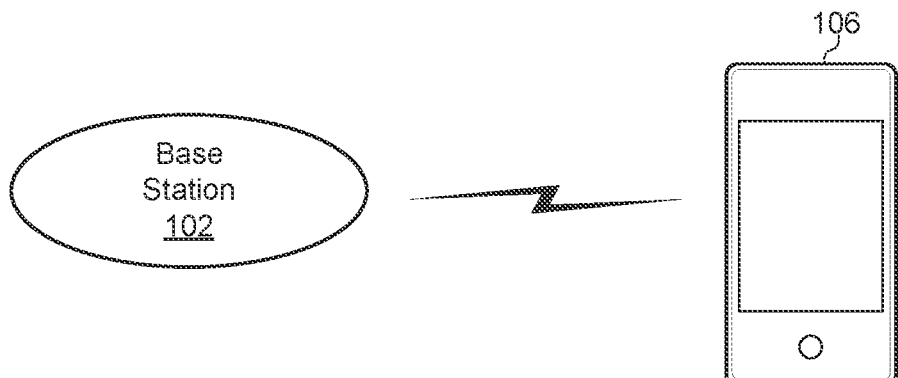
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 5G New Radio (NR), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., 5G NR) while base station 102B and core network 100B operate according to a second cellular communication standard. The second cellular communication standard (e.g., LTE, GSM, UMTS, and/or one or more CDMA2000 cellular communication standards) may be different from the first cellular communication standard or the same. The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., 5G NR and LTE, LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus, in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, LTE-A, or 5G NR). Thus, as noted above, a UE 106 might be configured to communicate with base station 102A (and/or other base stations) according to a first cellular communication standard (e.g., 5G NR) and might also be configured to communicate with base station 102B (and/or other base stations) according to a second cellular communication standard (e.g., LTE).

Base stations 102A and 102B and other base stations operating according to the same or different cellular communication standards may support one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a satellite phone, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, 5G New Radio (NR), WLAN, or GNSS. Other combinations of wireless communication standards are also possible.

The UE 106 may include one or more antennas (or, one or more antenna arrays) for communicating using one or more wireless communication protocols. Within the UE 106, one or more parts of a receive and/or transmit chain may be shared between multiple wireless communication standards; for example, the UE 106 might be configured to communicate using either (or both) of LTE or 5G NR using a single shared radio. The shared radio may include a single antenna, or may include a plurality of antennas (e.g., for MIMO and/or beamforming) for performing wireless communications. (MIMO is an acronym for Multi-Input Multiple-Output.) The antennas may be organized in one or more arrays.

Figure 4:
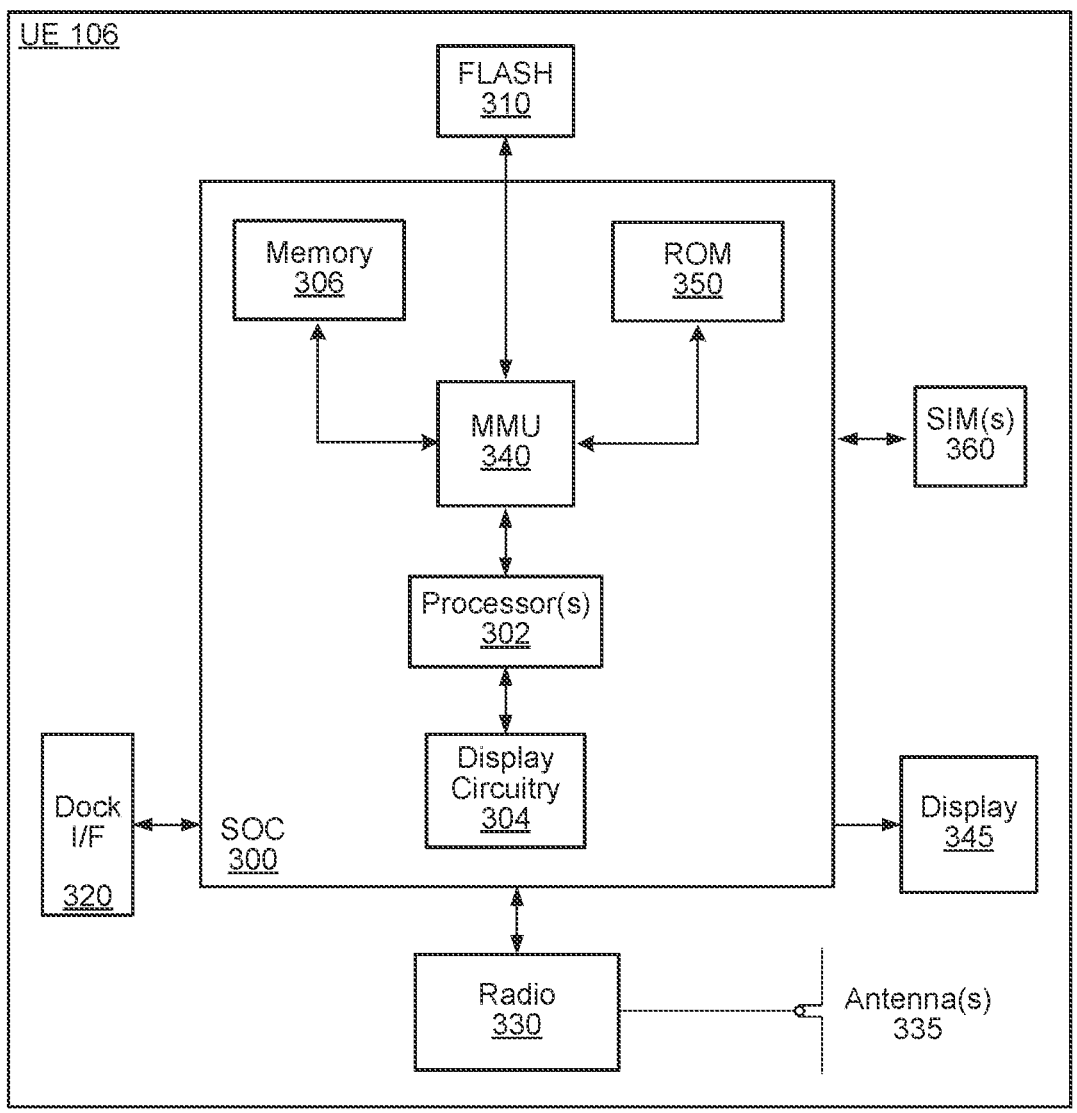
FIG. 4 illustrates an example of a block diagram of a user equipment (UE) device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, 5G NR, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas (e.g., organized in one or more arrays) to support applications such as dual connectivity or MIMO and/or beamforming. The antenna subsystem 335 transmits and receives radio signals to/from one or more base stations or devices through the radio propagation medium.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, 5G NR, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
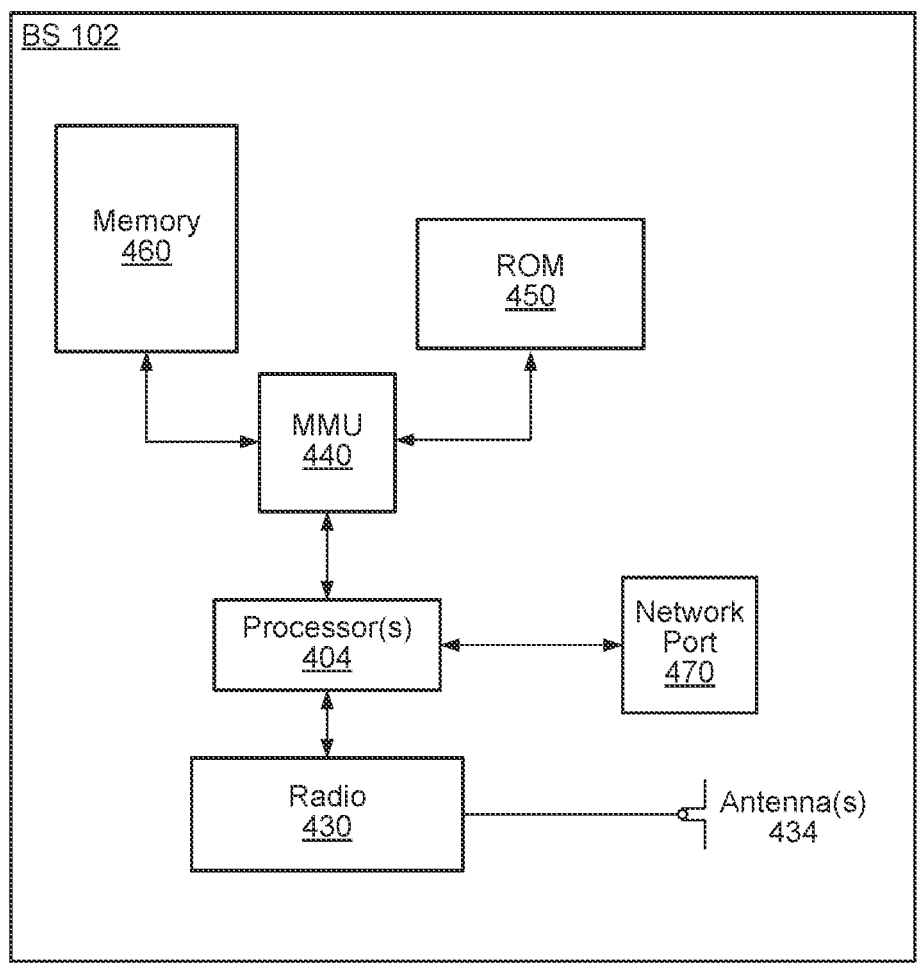
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide the telephone services (e.g., among UE devices served by the network provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas, or one or more arrays of antennas. A plurality of antennas would be needed, e.g., to support applications such as MIMO and/or beamforming. The antenna subsystem 434 transmits and receives radio signals to/from UEs through the radio propagation medium.

In some embodiments, the processor(s) 404 may include a baseband processor to generate downlink baseband signals and/or to process uplink baseband signals. The baseband processor may be configured to operate according to one or more wireless telecommunication standards, including, but not limited to, GSM, LTE, 5G New Radio, WCDMA, CDMA2000, etc.

The processor(s) 404 of the base station 102 may be configured to implement any of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
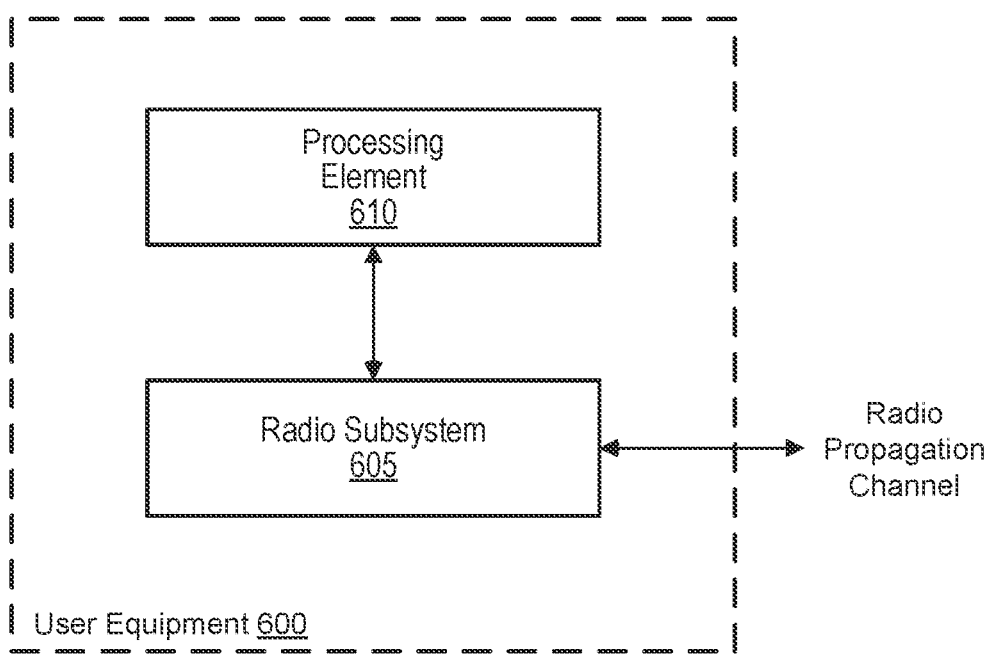
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or one or more arrays of antennas) to facilitate signal transmission and reception. Each transmit chain (or some of the transmit chains) may be tunable to a desired frequency, thus allowing the transmit chain to transmit at different frequencies at different times. Similarly, each receive chain (or some of the receive chains) may be tunable to a desired frequency, thus allowing the receive chain to receive at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem. The processing element may be configured to perform any of the UE-based method embodiments described herein.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

The UE device 600 may include memory (e.g., any of the memories described above in connection with user equipment 106 of FIG. 6, or any combination of those memories) that stores program instructions to implement any of the UE method embodiments described herein, e.g., program instructions to be executed by the processing element 610.

Figure 7:
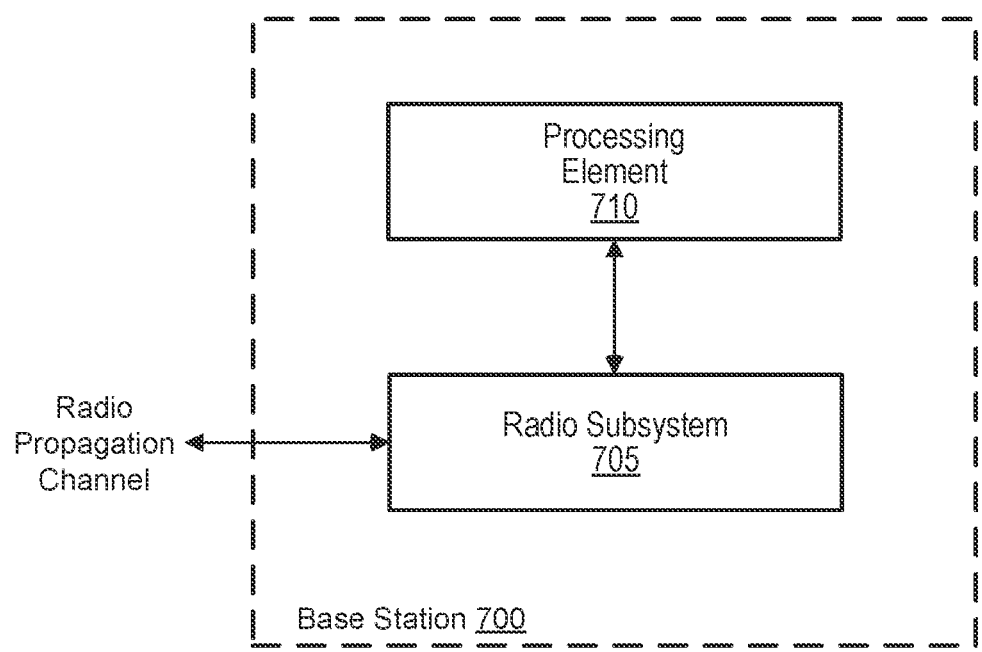
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.) The wireless base station may host one or more cells.

The radio subsystem 705 may include one or more RF chains. Each transmit/receive chain may be tunable to a desired frequency, thus allowing the transmit/receive chain to transmit/receive at different frequencies at different times. The radio subsystem 705 may be coupled to an antenna subsystem, including one or more antennas, e.g., an array of antennas, or a plurality of antenna arrays. The radio subsystem may employ the antenna subsystem to transmit and receive radio signals to/from the radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

The base station 700 may include memory (e.g., memory 460 of base station 102 of FIG. 5, or some other memory) that stores program instructions to implement any of the base station method embodiments described herein, e.g., program instructions to be executed by the processing element 710.

Sub-band Full Duplex (SB-FD)

Figure 8:
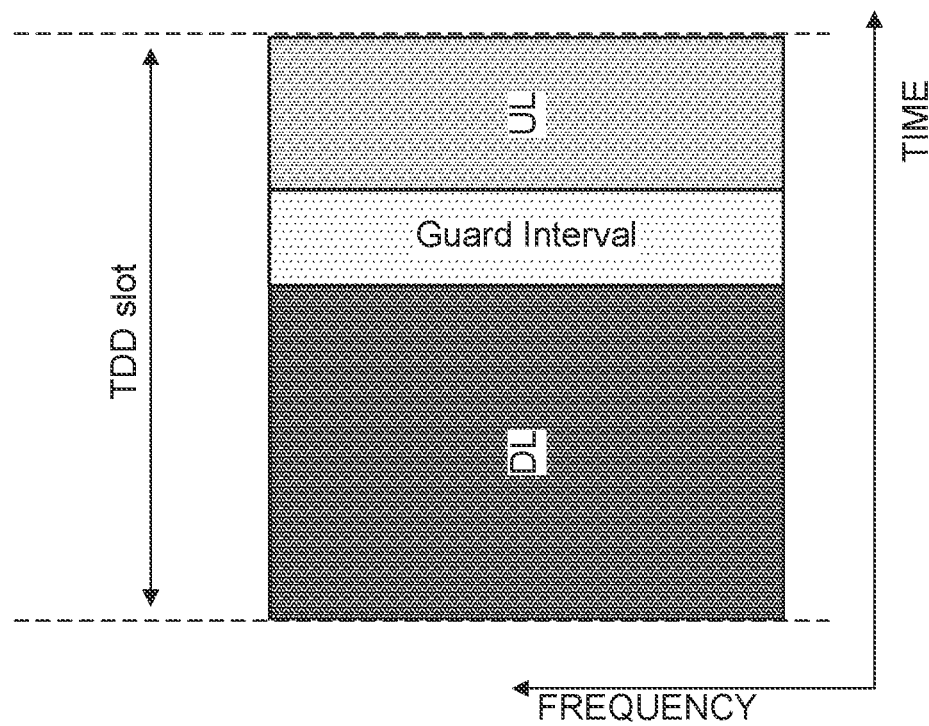
FIG. 8 illustrates an example of the contrast between a Frequency Domain Duplex (FDD) slot and a Time Domain Duplex (TDD) slot, according to some embodiments.
Figure 8:
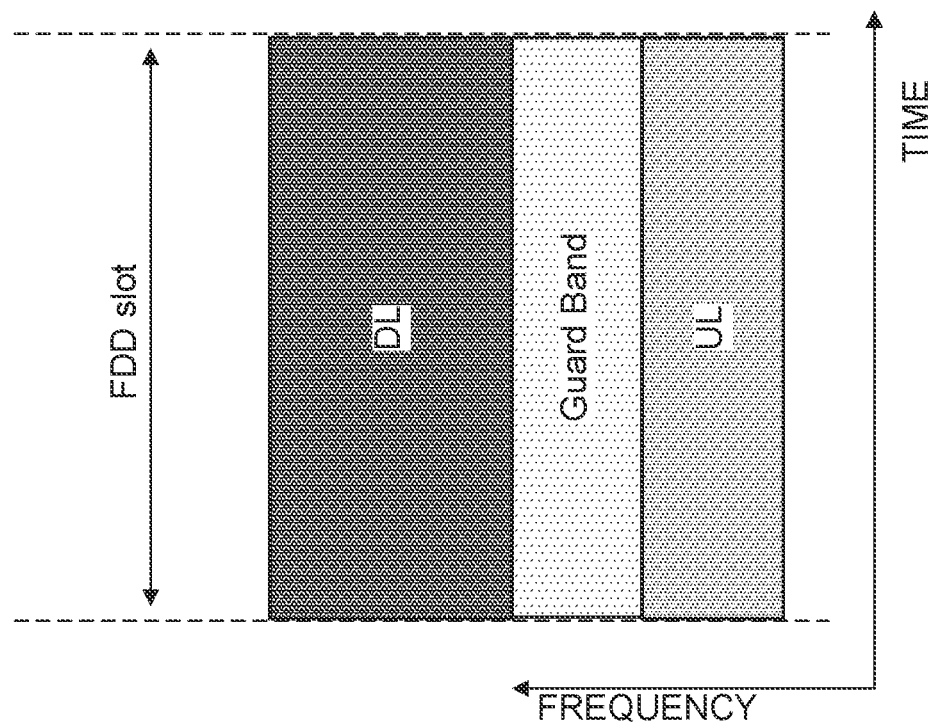

Full-duplex (FD) operation within a TDD band is a topic worthy of consideration. FIG. 8 illustrates an example of the contrast between a Frequency Domain Duplex (FDD) slot and a Time Domain Duplex (TDD) slot, according to traditional distinctions. Sub-band full-duplex (SB-FD) within a TDD band may aim to mimic FDD for which uplink (UL) latency is reduced, by allowing a first UE to transmit to the base station within a first frequency sub-band and a second UE to receive from the base station within a second frequency sub-band. Both the first and second frequency sub-bands may be within a frequency band reserved (e.g., allocated, defined by applicable standards, etc.) for TDD communications, such as FR2, as defined by 3GPP. By FD, we may refer to the case where (at least) the base station (e.g., gNB) is operating in full-duplex, i.e., simultaneously transmitting and receiving.

When considering full-duplex operation, it may be valuable in some contexts to assume that the UE operates in half-duplex mode, such that the UE may not transmit to the base station and receive from the base station simultaneously, and that the base station (or only the base station) operates in full-duplex mode on non-overlapping sub-bands. In such contexts, each UE may continue to implement TDD communications within one or more sub-bands of the TDD frequency band. However, uplink (UL) transmissions from a first UE may overlap in time with downlink (DL) reception by a second UE.

Figure 9:
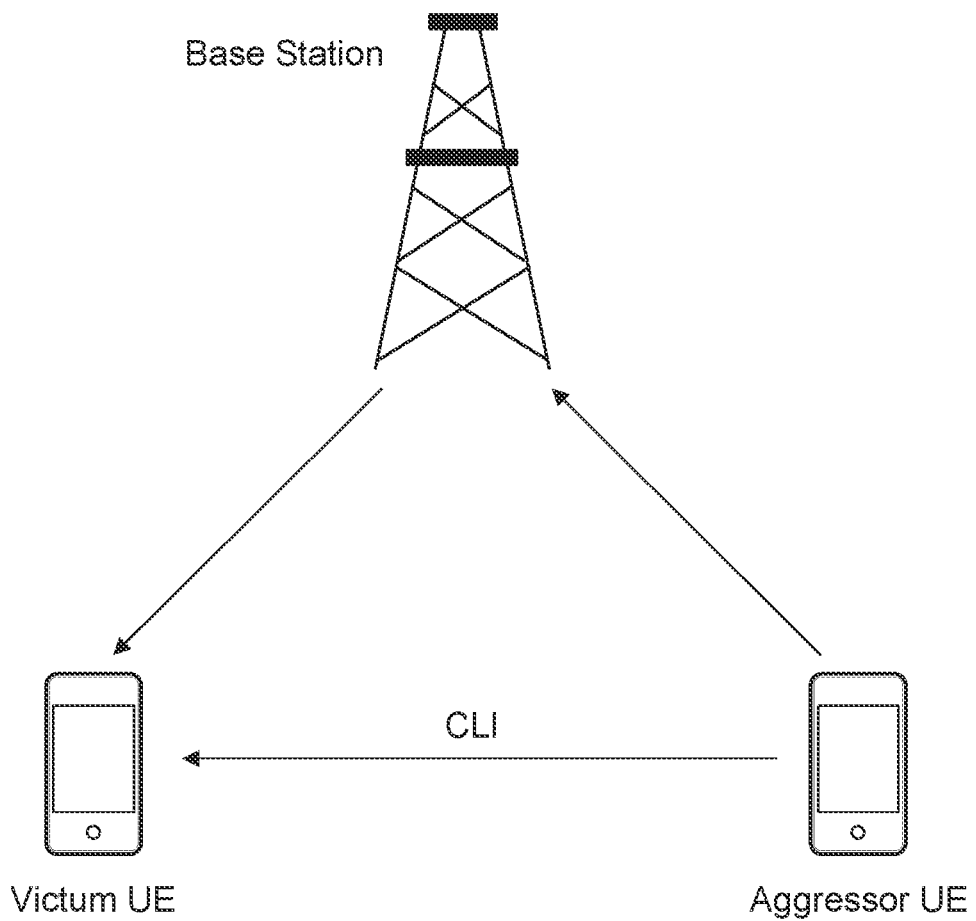
FIG. 9 illustrates an example of cross-link interference (CLI) between user equipments, according to some embodiments.

Thus, in the presence of FD communications, intra- and inter-cell UE-to-UE cross link interference (CLI) may occur. FIG. 9 illustrates an example of UE-to-UE CLI, where an aggressor UE (UEA) is transmitting to the base station, while a victim UE (UEv) is receiving from the base station, according to some embodiments. CLI may include out-of-band noise, harmonics, or any other energy transmitted by UEA at frequencies within the frequency range at which the UEv is receiving.

In some embodiments, a full-duplex base station (e.g., gNB) should be able to manage this CLI, at least for intra-cell UE-to-UE interference. For example, in some embodiments, UE-to-UE CLI may be managed using scheduler-based techniques. Scheduler-based techniques for CLI management may include techniques based on spatial separation and/or techniques based on separation in frequency.

In spatial separation, the aggressor UE and victim UEs are spatially separated. For example, the scheduler may require a pair of UEs that offer the potential of CLI to be sufficiently separated in distance.

Figure 10:
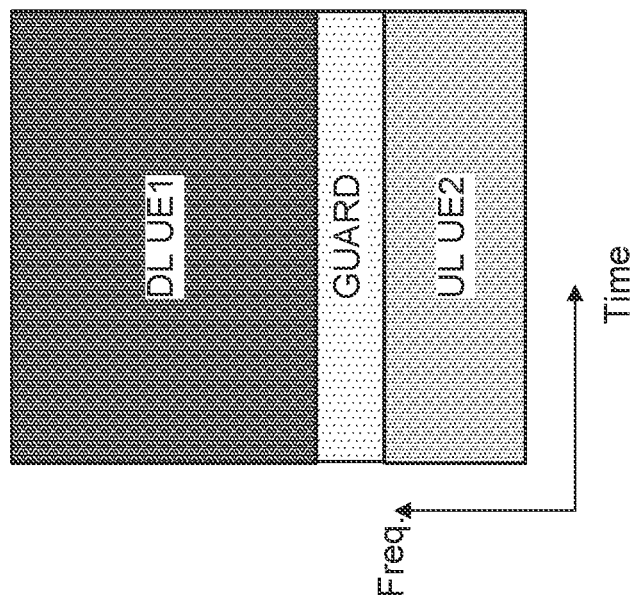
FIG. 10 illustrates an example of the use of a minimum guard band between a victim UE (denoted as UE1) and an aggressor UE (denoted as UE2), according to some embodiments.

In frequency separation, a guard band may be placed between the transmission allocation for aggressor UE and the reception allocation for the victim UE, e.g., as illustrated in FIG. 10. Some signaling between UEs and/or between the UE(s) and the serving base station may be utilized to better achieve this purpose.

Minimum Guard Band Requirements

As a first example of signaling for management of frequency separation within a TDD band, at least one of the victim UE or the aggressor UE may determine a minimum required (or requested) guard band between the DL resources of the victim UE and the UL resources associated with an aggressor UE, e.g., as shown in FIG. 10. Such a guard band (GB) can be in units of frequency, number of physical resource blocks (PRBs) for each tone spacing, etc. In some embodiments, such a GB can be defined between an edge tone of the aggressor UE's UL bandwidth part (BWP) and an edge tone of the victim UE's DL BWP. In some embodiments, such a GB can instead be defined between an edge tone of the resource allocation for UEA and an edge tone of the resource allocation for UEv. For example, a determined GB that is defined between an edge tone of the resource allocation for UEA and an edge tone of the resource allocation for UEv may be greater than the frequency range between the edge tone of the aggressor UL BWP and the edge tone of the victim DL BWP, e.g., if the resource allocation for one or both of the UEs avoids resources near the edge of the respective BWP. In some embodiments, a combination of the two approaches may be used.

In some embodiments, a UE may determine multiple minimum GB values, e.g., depending on various criteria. For example, the UE may determine multiple minimum GB values based on possible priority values of the downlink channel. E.g., the UE may determine a first minimum GB value for ultra-reliable low latency communications (URLLC) communications and a second (e.g., smaller) minimum GB value for enhanced mobile broadband (eMBB) communications, because URLLC communications may be more susceptible to disruption by CLI. As another example, the UE may determine multiple minimum GB values based on types of downlink signal/channel that is being (or may be) received. E.g., the UE may determine a first minimum GB value for use when receiving dynamic physical downlink shared channel (PDSCH) communications and a second GB value for use when receiving semi-persistent scheduling (SPS) communications. Or the UE may determine a first GB value for use when receiving data and a second GB value for use when receiving channel state information reference signal (CSI-RS) communications. Other options are also envisioned, and the preceding examples are not intended to be exhaustive or limiting.

The one or more minimum GB values may therefore be determined based on any of a number of factors relevant to managing CLI. For example, a GB value may be determined based at least in part on expected levels of out-of-band noise, expected harmonic values, susceptibility of expected DL signals to CLI, priority levels of expected DL signals, signal type and/or channel of expected DL signals, etc. As a specific example, a UE may estimate a minimum GB value that will prevent out-of-band noise within the DL BWP beyond some threshold level. In some scenarios, the threshold level may be adjusted based on priority levels of expected DL signals, signal type and/or channel of expected DL signals, etc.

In some embodiments, at least one of the victim UE or the aggressor UE (e.g., the UE that determined the minimum required guard band) may indicate the determined minimum required GB(s) to the base station. For example, the UE may indicate the minimum required guard band(s) as part of the UE capability signaling. Alternatively, at least one of the UEs may indicate the determined minimum required GB(s) at other times, e.g., dynamically, based on which of multiple determined minimum GBs is currently applicable.

In some embodiments, the base station (e.g., the gNB) may receive the indication of the determined guard band and may ensure the guard band requirement is satisfied, to prevent interference leakage from UEA to UEv. For example, when allocating BWPs and/or transmission/reception resources to UEA and/or UEv, the base station may ensure that the BWPs and/or the allocated resources are separated by at least the indicated minimum guard band.

Joint Bandwidth Part Switching

In some scenarios, a BWP assigned to a UE may be changed, e.g., in response to changing resource needs or requests of the UE. The base station may indicate a new BWP assignment to a UE. In traditional embodiments, UEs may be individually indicated to switch BWP. For example, in paired spectrum, an active UL BWP of a UE and an active DL BWP of the UE can switch independently, per UE. In unpaired spectrum, the active UL BWP of the UE and the active DL BWP of the UE may switch together, per UE.

In some embodiments of the present disclosure, a single message, such as a group common downlink control information (GC-DCI) message may be defined (or used) to indicate UEs that may switch active BWPs together (i.e., jointly). This indication may enable better management of UE-to-UE CLI. An example according to some embodiments is illustrated in FIG. 11.

Figure 11:
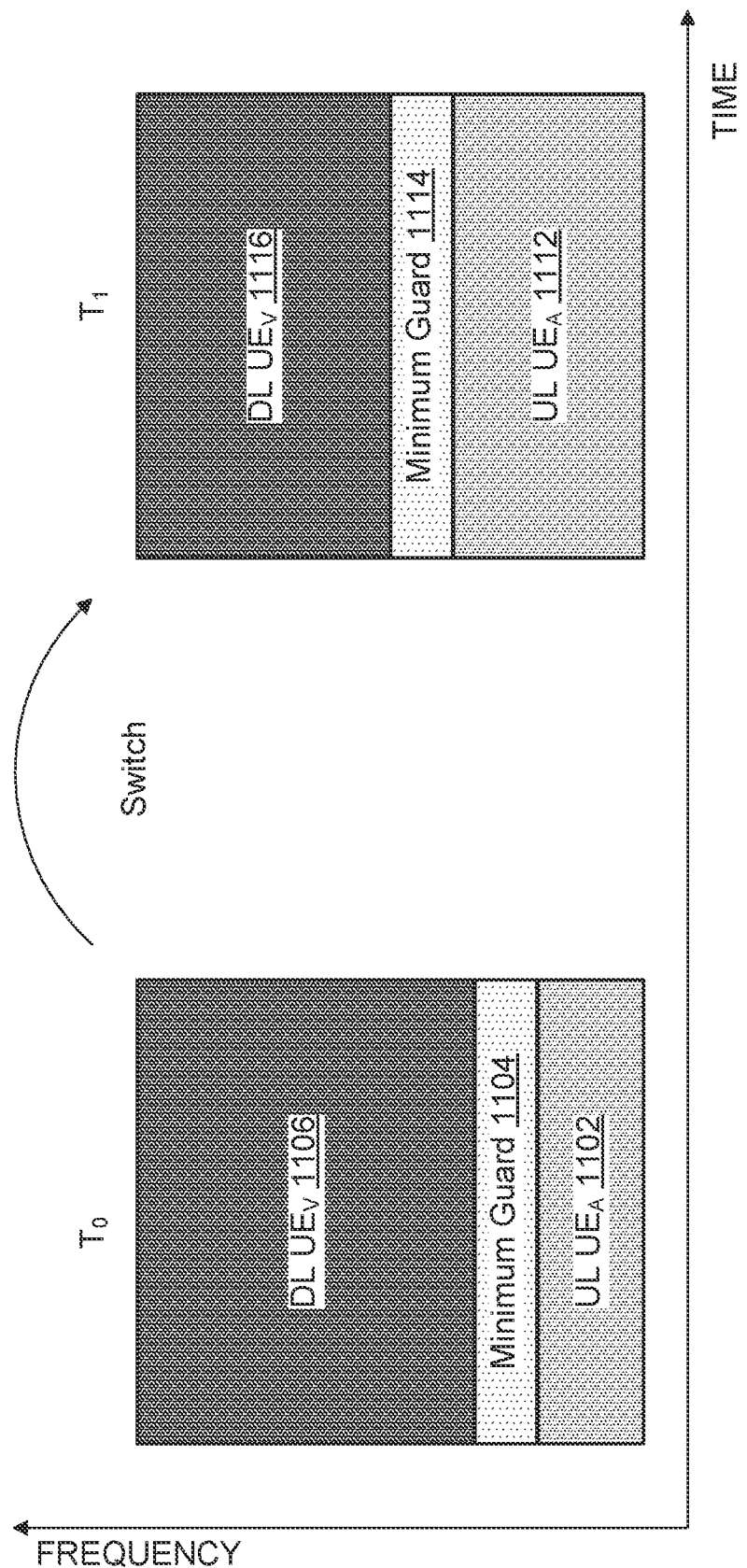
FIG. 11 illustrates an example of a victim UE (denoted as UEv) and an aggressor UE denoted as UEA) switching from existing BWPs to new BWPs, according to some embodiments.

In the scenario of FIG. 11, the base station may allocate to an aggressor UE (UEA) a first UL BWP 1102 in time for UEA to transmit within the first UL BWP 1102 at a first time ($T_0$). Similarly, the base station may allocate to a victim UE (UEv) a first DL BWP 1106 in time for UEv to receive within the first DL BWP 1106 at $T_0$. The base station may allocate a first guard band 1104 between the first UL BWP 1102 and the first DL BWP 1106, to prevent (or reduce) CLI between the two UEs. The first guard band 1104 may be allocated with a frequency width of at least a minimum guard band previously indicated by one or more of the UEs, e.g., as outlined above.

In response to an indication of increased UL traffic from UEA, or some other trigger, the base station may subsequently allocate to UEA a larger, second UL BWP 1112 to UEA. The base station may allocate a second guard band 1114 with a frequency width of at least the minimum guard band previously indicated by one or more of the UEs, e.g., as outlined above. To maintain this minimum guard band, the base station may allocate a correspondingly smaller second DL BWP 1116 to UEv. For example, the total frequency band used by the second UL BWP 1112, the second guard band 1114, and the second DL BWP 1116 may be the same (or substantially the same) as the total frequency band used by the first UL BWP 1102, the first guard band 1104, and the first DL BWP 1106. Thus, the DL BWP may be decreased by approximately the same amount by which the UL BWP was increased.

In this example, the base station may signal the change in UL BWP allocated to UEA and the change in DL BWP allocated to UEv within a single message, such as a single GC-DCI, transmitted to both UEA and UEv. In response to receiving the single message, each of UEA and UEv may utilize the respective newly allocated BWP to transmit or receive at a second time ($T_1$).

In some scenarios, the first DL BWP 1106 and the second DL BWP 1116 may be usable by a plurality of victim UEs. In such scenarios, the base station may signal the change in UL BWP and the change in DL BWP within a single message transmitted to both UEA and each UE of the plurality of victim UEs.

In another example, the base station may transmit a single message, such as a GC-DCI, to UEA and UEv (and to other victim UEs, as appliable), similarly indicating an increase in a DL BWP and a corresponding decrease in an UL BWP, while maintaining a previously indicated minimum guard band between them.

As yet another example, the base station may transmit a single message to at least UEA and UEv, indicating a change in allocation of at least one of the DL BWP and/or the UL BWP, wherein the change in allocation reflects a change in the size of the guard band. For example, in response to an indication that expected DL traffic will include traffic of a different signal type, channel, priority, etc., the base station may determine that a different minimum guard band is appropriate, e.g., based on a plurality of minimum guard bands previously provided by a UE, as discussed above. The base station may therefore change the allocation of at least one of the DL BWP and/or the UL BWP to accommodate the change in size of the guard band.

When switching between two BWP allocations, a certain minimum amount of time may be reserved to allow the UE to reconfigure applicable hardware and/or software to accommodate the new BWP allocation. Knowledge of this minimum switching delay is important for subsequent communication timing. In current 3GPP specifications, the minimum switching delay is based on subcarrier spacing (SCS) of the UE's current/next active BWP.

For joint BWP switching, a single reference may be employed for all UEs affected by the single BWP switching message (UEs for which a new BWP is allocated), such that all the affected UEs will know how to follow the timeline. For example, in some embodiments, a reference SCS is supported. The minimum switching delay may be defined based on the reference SCS for all affected UEs. Because the affected UEs may not all have the same SCS, the reference SCS may be different from the SCS of one or more of the affected UEs. The reference SCS may be transmitted to the UEs by higher layer signaling. Alternatively, the reference SCS can be indicated as part of group common downlink control information (GC-DCI), e.g., the GC-DCI used to communicate the changes in BWPs, or another GC-DCI.

In some embodiments, a BWP switch delay is defined from the beginning of DL slot in which the affected UEs are expected to receive GC-DCI indicating joint BWP switch.

In some embodiments, one or more of the affected UEs may acknowledge the joint BWP switch indication. For example, in some embodiments, both the victim and the aggressor UEs may acknowledge the joint BWP switch indication, e.g., by transmitting to the base station a message including an acknowledgment.

Alternatively, only the aggressor UE may be required to acknowledge the joint BWP switch indication. In such embodiments, victim UEs may forgo providing any acknowledgement to the base station. The base station may be able to operate without such an explicit acknowledgement, at least in some scenarios. For example, if the joint BWP switch message indicates that the DL BWP has been reduced, then the base station may avoid scheduling any DL resources within the region that is no longer included in the updated DL BWP. Thus, even if a victim UE fails to receive the joint BWP switch indication (which failure is unknown to the base station because the base station does not expect any acknowledgement indication from the victim UE), DL communications to the victim UE are not compromised, as the victim UE will merely monitor a DL region that is larger than necessary. In such cases, the only drawback will likely be a relatively small waste of power by the victim UE, by reason of monitoring the extra region.

As another alternative, only the UE whose BWP (DL BWP for victim, or UL BWP for aggressor) is increased acknowledges the joint BWP switch indication. In the example of FIG. 11, it is aggressor UEA that should acknowledge detection of the joint BWP switch indication. As in the previous example, a UE having a BWP that was reduced in size by the joint BWP switch indication may continue to operate effectively (if less efficiently), even if the joint BWP switch indication is not received thereby, because the base station will not schedule transmission or reception for that UE within the region removed from the BWP applicable to that UE.

In some embodiment, the acknowledgement may be sent on a medium access control (MAC) control element (MAC-CE), e.g., on the new BWP or current BWP, or it can be sent on a physical uplink control channel (PUCCH). In the latter case, the resource for the PUCCH transmission can be indicated to the UE as part of GC-DCI, e.g., the GC-DCI used to communicate the changes in BWPs, or another GC-DCI.

In some embodiments, an acknowledge message may be sent by a UE to the base station in response to completion of the switch to the new bandwidth part.

Figure 12:
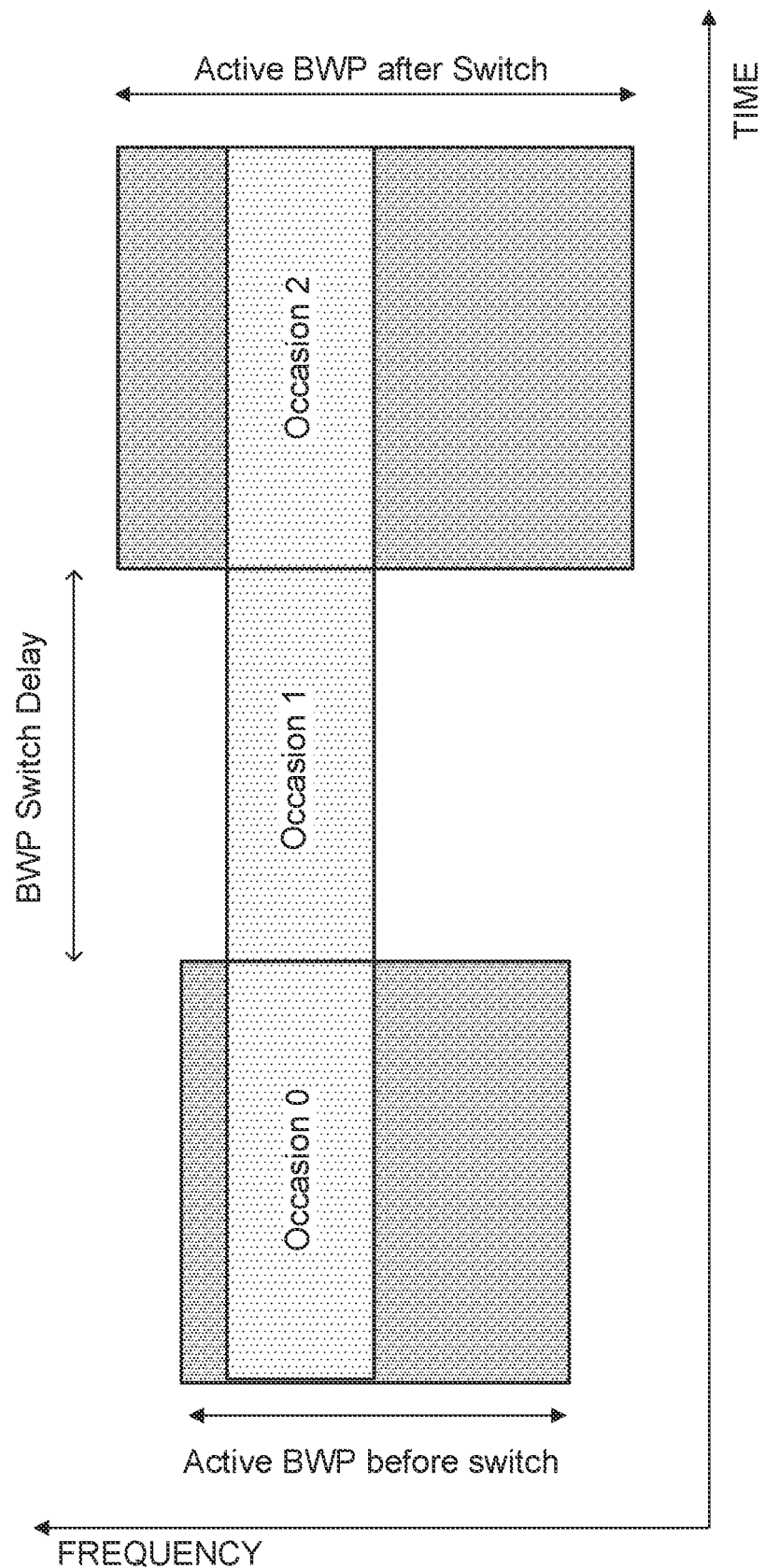
FIG. 12 illustrates an example of a policy for handling repetitions of a transmission or reception that occur during a BWP switch delay, according to some embodiments.

In some embodiments, due to a joint BWP switch, e.g., indicated by the GC-DCI, transmission or reception of one of the UEs (aggressor or victim) may lie within the BWP switch delay. In particular, where a transmission has a plurality of repetition occasions, one or more repetition occasions may fall within the BWP switch delay. In such scenarios, accommodation should be made regarding how to handle these repetition occasions. FIG. 12 illustrates an example of such a situation, in which a first repetition occasion (Occasion 0) occurs prior to BWP switching, a second repetition occasion (Occasion 1) occurs within the BWP switch delay period, and a third repetition occasion (Occasion 2) occurs after BWP switching.

In a first embodiment, any repetition occasion scheduled to occur within the BWP switch delay may be dropped (e.g., the UE may forgo transmitting or receiving the repetition). If any repetition occasions are scheduled to occur after the BWP switch delay, such occasions may be used within the new active BWP. For example, within the context illustrated in FIG. 12, a first repetition may be transmitted within Occasion 0, according to the original BWP allocation, but Occasion 1 may be dropped. At Occasion 2, another repetition may be transmitted, according to the new BWP allocation.

In a second embodiment, behavior may be the same as in the first embodiment, except that the number of repetitions may be extended in the new active BWP, e.g., to compensate for the dropped repetitions during the BWP switch delay. Thus, the total number of available repetitions may be the same as (or similar to) the number of repetitions that would have occurred if there was no switch. For example, the total number of available repetitions may be the same as (or similar to) the number of repetitions configured by a network or specified by a wireless communication standard. Within the context of FIG. 12, a first repetition may be transmitted within Occasion 0, according to the original BWP allocation, but no transmission may occur within the BWP switch delay period in which Occasion 1 was originally scheduled. Occasion 1 and Occasion 2 may both occur following the BWP switch delay, according to the new BWP allocation.

Note that, in both the first and second embodiments, the rest of the occasions are used if the Frequency Domain Resource Allocation (FDRA) matches in the new active BWP.

In a third embodiment, all remaining repetitions following the start of the BWP switch delay are dropped. For example, in the context of FIG. 12, a first repetition may be transmitted within Occasion 0, according to the original BWP allocation, but all subsequent occasions may be dropped.

In a fourth embodiment, the UE does not expect such a BWP switch indication. For example, the base station may be constrained to delay any BWP switch (or any joint BWP switch) until all scheduled repetition occasions have occurred. However, in the context of joint BWP switching, there may be higher priority requirements for one or more other UE, so it may be difficult to enforce this constraint.

Virtual Common Downlink Bandwidth Part

Figure 13:
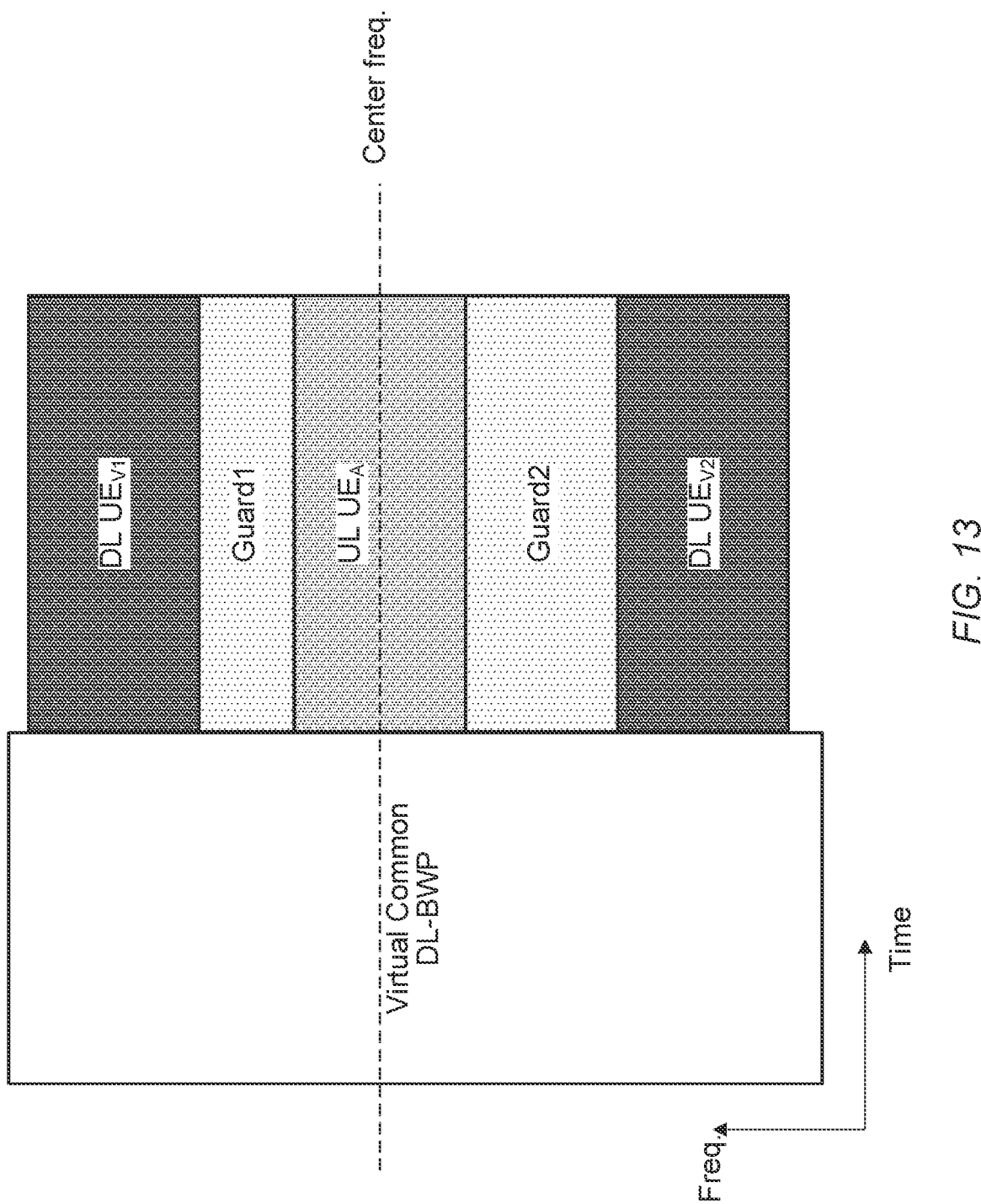
FIG. 13 illustrates an example of the use of a virtual common downlink BWP, which includes the downlink BWPs of one or more victim UEs and the uplink BWP of an aggressor UE, according to some embodiments.

In some embodiments, if there is no overlapping between the UL BWP of aggressor UEA and the DL BWP of victim UEv, a virtual common DL BWP may be defined which overlaps with the actual DL BWPs and UL BWPs of victim UEs and aggressor UEs, respectively. This large virtual DL-BWP may have the same center frequency as the UL BWP. The UL BWP(s) of one or more aggressor UEs may be grouped in around the center of the virtual common DL BWP, and the DL BWPs of the victim UEs may be placed at the ends of the virtual common DL-BWP, e.g., as shown in FIG. 13, according to some embodiments. A first guard band may be placed between the UL BWP(s) and the DL BWP(s) at the upper end, and a second guard band may be placed between the UL BWP(s) and the DL BWP(s) at the lower end. The guard bands may be of sufficient size to allow an increase in size of the UL BWP(s) without necessitating a decrease in the size of the DL BWPs. Thus, the UE(s) in DL do not necessarily need to switch to smaller actual DL BWP(s), e.g., even when the UL BWP of an aggressor UE is increased to a larger size. It is sufficient for a UE to know what is the actual DL-BWP (or actual DL-BWP size) for the UE, and how Frequency-Domain Resource Allocation (FDRA) for the UE is derived. The smaller size of the actual DL-BWPs can save DCI bit size for FDRA indication in DL grants.

In some embodiments, if there is no overlapping between the DL BWP of UEA and the UL BWP of UEB, a virtual common DL BWP may be defined which overlaps with the actual DL BWPs of victim UE(s) and the UL BWPs of aggressor UE(s).

EXAMPLE EMBODIMENTS

In keeping with the preceding description, various examples may be presented, as follows.

1.1 A method is presented for operating a first user equipment (UE), the method comprising: transmit an indication of a minimum required guard band between a downlink bandwidth part (BWP) of the first UE and an uplink BWP of an aggressor UE.

1.2 The method of claim 1.1, wherein the downlink BWP and said uplink BWP occur within a TDD band.

1.3 The method of claim 1.1, wherein the indication is transmitted within a message indicating the first UE's capabilities.

1.4 The method of claim 1.1, wherein said aggressor UE is a second UE within the same cell as the first UE.

1.5 The method of claim 1.1, wherein said aggressor UE is any other UE within the same cell as the first UE.

1.6 A method for operating a first user equipment (UE), the method comprising:
determining a minimum required guard band between a downlink bandwidth part (BWP) of the first UE and an uplink BWP of an aggressor UE.

1.7 The method of claim 1.6, wherein the minimum required guard band is determined based on one or more of the following: a priority of a downlink channel assigned to the first UE; a type of downlink signal that is being received by the first UE; or a type of downlink channel that is being received by the first UE.

1.8 The method of claim 1.7, further comprising: transmitting an indication of the minimum required guard band to a base station.

1.9 A method for operating a base station, the method comprising: receive an indication of a minimum required guard band size between a downlink bandwidth part (BWP) of the first UE and any uplink BWP of any aggressor UE.

1.10 The method of claim 1.9, further comprising: configure or reconfigure an actual guard band between the downlink BWP and a first uplink BWP corresponding to a first aggressor UE, wherein a size of the actual guard band is greater than or equal to the minimum guard band size.

1.11 The method of claim 1.9, further comprising: configure or reconfigure a first uplink BWP corresponding to a first aggressor UE so that a size of an actual guard band between the first uplink BWP and the downlink BWP to greater than equal to the minimum guard band size.

1.12 The method of claim 1.9, wherein the downlink BWP and said uplink BWP occur within a TDD band.

1.13 The method of claim 1.9, wherein the indication is received as part of a message, from the first UE, indicating the first UE's capabilities.

1.14 The method of claim 1.9, wherein said any aggressor UE is a UE within the same cell as the first UE.

1.15 A method for operating a first user equipment (UE), the method comprising:
determining a minimum required guard band between a downlink bandwidth part (BWP) of the first UE and an uplink BWP of an aggressor UE.

1.16 The method of claim 1.15, wherein the minimum required guard band is determined based on one or more of the following: a priority of a downlink channel assigned to the first UE; a type of downlink signal that is being received by the first UE; or a type of downlink channel that is being received by the first UE.

1.17 The method of claim 1.16, further comprising: transmitting an indication of the minimum required guard band to a base station.

2.1 A method is presented for operating a first user equipment (UE), the method comprising: receive a group common DCI, from a base station, wherein the group common DCI indicates a plurality of UEs that a required to switch their respective bandwidth parts, wherein the first UE is included in the plurality of UEs.

2.2 The method of claim 2.1, further comprising: decode the group common DCI to determine a new bandwidth part for the first UE; and switch to the new bandwidth part.

2.3 The method of claim 2.1, wherein, for each of the UEs of said plurality, the group common DCI includes a corresponding new bandwidth part, to which the UE is to switch.

2.4 The method of claim 2.3, wherein the group common DCI indicates that UEs of said plurality are switch to the respective new bandwidth parts within a switch delay period.

2.5 The method of claim 2.3, wherein the group common DCI indicates a reference subcarrier spacing, to facilitate determination of a common minimum delay for BWP switching at each UE of said plurality, the method further comprising: determining the common minimum delay.

2.6 A method for operating a base station, the method comprising: transmit a group common DCI indicating a plurality of UEs that are required or requested to switch their respective bandwidth parts.

2.7 The method of claim 2.6, wherein, for each of the UEs of said plurality, the group common DCI a corresponding indication of a corresponding new bandwidth part for the UE.

2.8 The method of claim 2.7, wherein the group common DCI indicates that UEs of said plurality are switch to the respective new bandwidth parts within a switch delay period.

2.9 The method of claim 2.8, wherein the base station has arranged the new bandwidth parts so as to maintain a minimum guard band between an uplink BWP and a downlink BWP among the new bandwidth parts.

2.10 The method of claim 2.8, wherein the base station has arranged the new bandwidth parts so that, for any adjacent pair of uplink BWP and downlink BWP among the new bandwidth parts, a corresponding minimum guard band is ensured.

2.11 The method of claim 2.6, wherein the group common DCI indicates a reference subcarrier spacing, to facilitate determination of a common minimum delay for BWP switching at each UE of said plurality.

3.1 A method is presented for operating a first user equipment (UE), the method comprising: receive an indication of a reference subcarrier spacing (SCS) from a base station, wherein the reference SCS is associated with a joint BWP switch indication; determine a minimum switch delay based on the reference SCS; and switch to a new bandwidth part indicated by the joint BWP switch indication, wherein the switch is completed so sooner than the minimum switch delay.

3.2 The method of claim 3.1, wherein the indication of the SCS is received as part of a group common DCI that also includes the joint BWP switch indication.

3.3 The method of claim 3.1, wherein the indication of the SCS is received as part of higher layer signaling from the base station.

3.4 A method is presented for operating a base station, the method comprising: transmit an indication of a reference subcarrier spacing (SCS), wherein the reference SCS is transmitted in association with a joint bandwidth part (BWP) switch message addressed to a plurality of user equipment (UEs), wherein reference SCS is usable by UEs of the plurality to determine a common value of minimum switch delay.

3.5 The method of claim 3.4, wherein the indication of the SCS is transmitted as part of a group common DCI that also includes the joint BWP switch message.

3.6 The method of claim 3.4, wherein the indication of the SCS is transmitted as part of higher layer signaling.

3.7 The method of claim 3.1, wherein the joint BWP switch message directs the UEs of said plurality to switch to respective new BWPs.

4.1 A method is presented for operating a base station, the method comprising: transmit a joint bandwidth part (BWP) switch indication to a group of UEs including at least one victim UE and at least one aggressor UE; and receive one or more acknowledgements of the joint BWP switch indication from one or more UEs of the group, respectively.

4.2 The method of claim 4.1, wherein the one or more acknowledgements are received from the at least one victim UE and the at least one aggressor UE.

4.3 The method of claim 4.1, wherein the one or more acknowledgements are received only from the at least one aggressor UE of said group.

4.4 The method of claim 4.1, wherein the one or more acknowledgements are received only from the one or more UEs, of said group, whose BWP is indicated to be increased by said joint BWP switch indication.

4.5 The method of claim 4.1, wherein a first of the one or more the acknowledgements is received from a first of the one or more UEs of the group, wherein the first acknowledgement is received on a Physical Uplink Control Channel (PUCCH).

4.6 The method of claim 4.5, wherein a resource for the PUCCH is indicated to the first UE in the joint bandwidth part (BWP) switch indication.

4.7 The method of claim 4.1, wherein the joint bandwidth part (BWP) switch indication is transmitted in group common downlink control information (GC-DCI).

4.8 The method of claim 4.1, wherein a first of the one or more the acknowledgements is received from a first of the one or more UEs of the group, wherein the first acknowledgement is received as part of a Medium Access Control-Control Element (MAC-CE).

4.9 A method is presented for operating a first user equipment (UE), the method comprising: receive a joint bandwidth part (BWP) switch indication from a base station, wherein the joint BWP switch indication directs a plurality of UEs to switch their respective bandwidth parts to respective new bandwidth parts, wherein the plurality of UEs include the first UE; and transmit an acknowledgement of the joint BWP switch indication to the base station.

4.10 the method of claim 4.8, wherein the first UE is an aggressor UE in a cross link interference (CLI) scenario.

4.11 The method of claim 4.8, wherein the said transmission of the acknowledgement is conditioned upon the new bandwidth part for the first UE being of increased size relative to an existing BWP of the first UE.

4.12 The method of claim 4.8, wherein the said transmission of the acknowledgement is conditioned upon (a) the new BWP for the first UE being a uplink BWP and (b) the uplink bandwidth part being of increased size relative to an existing uplink BWP of the first UE.

4.13 The method of claim 4.8, wherein the acknowledgement indicates successful receipt of the joint BWP switch indication.

4.14 The method of claim 4.9, wherein the acknowledgement is transmitted to the base station on a Physical Uplink Control Channel (PUCCH).

4.15 The method of claim 4.15, wherein a resource for the PUCCH transmission is indicated to the first UE in the joint bandwidth part (BWP) switch indication.

4.16 The method of claim 4.9, wherein the joint bandwidth part (BWP) switch indication is received as part of group common downlink control information (GC-DCI).

4.17 The method of claim 4.9, wherein the acknowledgement is transmitted as part of a Medium Access Control-Control Element (MAC-CE).

5.1 A method is presented for operating a first user equipment (UE), the method comprising: receive, from a base station, a message indicating a virtual common downlink bandwidth part (BWP).

5.2 The method of claim 5.1, wherein the virtual common downlink BWP covers an extent in frequency that includes: one or more downlink BWPs, including a first BWP for the first UE; and a group of one or more uplink BWPs for one or more aggressor UEs.

5.3 The method of claim 5.2, wherein a center frequency of the group corresponds to a center frequency of the virtual common downlink BWP.

5.4 The method of claim 5.2, wherein the one or more downlink BWPs include at least one first downlink BWP and at least one second downlink BWP, wherein the at least one first BWP is located at a first end of the virtual common downlink BWP, wherein the at least one second BWP is located at a second end of the virtual common downlink BWP.

5.5 The method of claim 5.4, wherein a first guard band intervenes between the at least one first downlink BWP and the group of one or more uplink BWPs, wherein a second guard band intervenes between the at least one second BWP and the group of one or more uplink BWPs.

5.6 The method of claim 5.5, wherein the first and second guards bands are configured to be of sufficient size as to allow an increase in the size of the group of one or more uplink BWPs without necessitating a decrease in any of the one or more downlink BWPs.

5.7 A method is presented for operating a base station, the method comprising: transmit a message indicating a virtual common downlink bandwidth part (BWP) for a plurality of UEs.

5.8 The method of claim 5.7, wherein the virtual common downlink BWP covers an extent in frequency that includes:

one or more downlink BWPs for one or more victim UEs, respectively; and a group of one or more uplink BWPs for one or more aggressor UEs, respectively.

5.9 The method of claim 5.8, wherein a center frequency of the group corresponds to a center frequency of the virtual common downlink BWP.

5.10 The method of claim 5.8 wherein the one or more downlink BWPs include at least one first downlink BWP and at least one second downlink BWP, wherein the at least one first BWP is located at a first end of the virtual common downlink BWP, wherein the at least one second BWP is located at a second end of the virtual common downlink BWP.

5.11 The method of claim 5.10, wherein a first guard band intervenes between the at least one first downlink BWP and the group of one or more uplink BWPs, wherein a second guard band intervenes between the at least one second BWP and the group of one or more uplink BWPs.

5.12 The method of claim 5.11, wherein the first and second guards bands are configured to be of sufficient size as to allow an increase in the size of the group of one or more uplink BWPs without necessitating a decrease in any of the one or more downlink BWPs.

6.1 A method is presented for operating a first user equipment (UE), the method comprising: receive, from a base station, a message indicating a joint BWP switch for a plurality of UEs, wherein the plurality of UEs includes the first UE; in response to determining that one or more repetitions of a transmission or reception by the first UE would occur within a BWP switch delay period corresponding to the joint BWP switch, refrain from performing those one or more repetitions; and switch from an existing bandwidth part to a new bandwidth part for the first UE.

6.2 The method of claim 6.1, wherein the new bandwidth part is indicated in the joint BWP switch.

6.3 The method of claim 6.1, further comprising: perform one or more repetitions of the transmission or reception after the first UE has switched to the new bandwidth part.

6.4 The method of claim 6.3, wherein a number of the one or more repetitions performed after the first UE has switched to the new bandwidth part is equal the number of the one or more repetitions dropped during the BWP switch delay period.

6.5 The method of claim 6.1, wherein the first UE refrains from performing any repetitions of the transmission or reception after the first UE has switched to the new bandwidth.

6.6 The method of claim 6.1, wherein the message is received as part of a group common DCI from the base station.

6.7 The method of claim 6.1, wherein the first UE is a victim UE in a cross link interference (CLI) scenario, wherein the existing BWP and the new BWP are downlink BWPs.

6.8 The method of claim 6.1, wherein the first UE is an aggressor UE in a cross link interference (CLI) scenario, wherein the existing BWP and the new BWP are uplink BWPs.

6.9 A method is presented for operating a base station, the method comprising: transmit a message indicating a joint bandwidth part (BWP) switch for a plurality of UEs, wherein, for each of the UEs of said plurality, the message indicates a corresponding new BWP for the UE; and in response to determining that one or more repetitions of a transmission or reception to/from a first of the UEs would occur within a BWP switch delay period of the first UE, refrain from performing those one or more repetitions to/from the first UE.

6.10 The method of claim 6.9, wherein the plurality of UEs include at least one victim UE and at least one aggressor UE in a cross-link interference (CLI) scenario.

6.11 The method of claim 6.9, further comprising: perform one or more repetitions of the transmission or reception to/from the first UE after the first UE has switched to the corresponding new BWP.

6.12 The method of claim 6.11, wherein a number of the one or more repetitions performed after the first UE has switched to the corresponding new bandwidth part is equal the number of the one or more repetitions dropped during the BWP switch delay period of the first UE.

6.13 The method of claim 6.9, wherein the base station refrains from performing any repetitions of the transmission or reception to/from the first UE after an end of the BWP switch delay period of the first UE.

6.14 The method of claim 6.9, wherein the message is transmitted as part of a group common DCI from the base station.

6.15 The method of claim 6.9, wherein the first UE is a victim UE in a cross link interference (CLI) scenario, wherein the new BWP corresponding to the first UE is a downlink BWP.

6.16 The method of claim 6.9, wherein the first UE is an aggressor UE in a cross link interference (CLI) scenario, wherein the new BWP corresponding to the first UE is an uplink BWP.

In some embodiments, a non-transitory memory medium may store program instructions. The program instructions, when executed by processing circuitry, may cause the processing circuitry to perform any of the method embodiments described above, and any combination of those embodiments. The memory medium may be incorporated as part of a base station.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a first user equipment (UE), the method comprising:
   determining a first minimum frequency guard band value for use between frequency resources associated with downlink communications between the first UE and a base station, and frequency resources associated with uplink communications between a second UE and the base station;
   transmitting to the base station an indication of the first minimum frequency guard band value; and
   receiving from the base station a downlink bandwidth part (BWP) allocation for the first UE accommodating the first minimum frequency guard band value;
   receiving from the base station a group common downlink control information (GC-DCI) message indicating a change of downlink BWP allocation for the first UE and a change of uplink BWP allocation for the second UE, wherein the changed allocations accommodate the first minimum frequency guard band value; and
   in response to determining that a repetition occasion of a downlink transmission from the base station falls within a minimum switching delay associated with the change of downlink BWP allocation, dropping all subsequent repetitions of the downlink transmission.

2. The method of claim 1, wherein the frequency resources allocated for the uplink communications and the frequency resources allocated for the downlink communications are located within a frequency band reserved for time division duplex (TDD) communications.

3. The method of claim 1, wherein the indication of the first minimum frequency guard band value is transmitted within a UE capability information message of the first UE.

4. The method of claim 1, wherein the first minimum frequency guard band value is determined as a minimum frequency guard band value to be allocated between an edge tone of a downlink BWP allocated to the first UE and an edge tone of an uplink BWP allocated to the second UE.

5. The method of claim 1, wherein the first minimum frequency guard band value is determined as a minimum frequency guard band value to be allocated between an edge tone of downlink resources allocated to the first UE and an edge tone of uplink resources allocated to the second UE.

6. The method of claim 1, wherein the first minimum frequency guard band is determined based on at least one of:
   a priority of a downlink channel to be received by the first UE;
   a type of downlink signal to be received by the first UE; or
   a type of downlink channel to be received by the first UE.

7. The method of claim 1, further comprising:
   determining a second minimum frequency guard band value for use between frequency resources associated with downlink communications between the first UE and a base station, and frequency resources associated with uplink communications between a second UE and the base station, wherein the first minimum frequency guard band value is for use when downlink communications for the first UE have a first set of characteristics, and wherein the second minimum frequency guard band value is for use when downlink communications for the first UE have a second set of characteristics.

8. The method of claim 7, wherein the first set of characteristics and the second set of characteristics differ in at least one of:
   channel priority;
   signal type; or
   channel type.

9. The method of claim 1, further comprising:
   in response to determining that the change of downlink BWP allocation for the first UE increases the downlink BWP allocation for the first UE, providing to the base station an acknowledgement that the first UE has received the GC-DCI message.

10. The method of claim 1, further comprising:
    receiving from the base station an indication of a reference sub-carrier spacing (SCS) value for use in determining a minimum switching delay associated with the change of downlink BWP allocation, wherein the reference SCS is different from a SCS of the first UE.

11. The method of claim 10, wherein the indication of the reference SCS is received in the GC-DCI message.

12. The method of claim 1, wherein the GC-DCI includes an indication of a PUCCH resource for use in indicating an acknowledgement that the GC-DCI has been received.

13. A user equipment (UE) device, comprising:
    memory storing software instructions; and
    processing circuitry configured to execute the software instructions to:
      determine a first minimum frequency guard band value for use between frequency resources associated with downlink communications between the UE device and a base station, and frequency resources associated with uplink communications between an aggressor UE device and the base station;
      provide an indication of the first minimum frequency guard band value for transmission to the base station;
      receive a downlink bandwidth part (BWP) allocation for the UE device accommodating the first minimum frequency guard band value;
      receive from the base station a group common downlink control information (GC- DCI) message indicating a change of downlink BWP allocation for the UE and a change of uplink BWP allocation for the aggressor UE, wherein the changed allocations accommodate the first minimum frequency guard band value; and in response to determining that a first repetition occasion of a downlink transmission from the base station falls within a minimum switching delay associated with the change of downlink BWP allocation:

drop the first repetition of the downlink transmission during the minimum switching delay; and receive a second repetition of the downlink transmission following the minimum switching delay.

14. A base station of a wireless communication network, the base station comprising:

memory storing software instructions; and processing circuitry configured to execute the software instructions to:

receive an indication of a first minimum frequency guard band value for use between frequency resources associated with downlink communications between a first user equipment (UE) and the base station, and frequency resources associated with uplink communications between a second UE and the base station;

allocate downlink resources for the first UE and uplink resources for the second UE, wherein the downlink resources are separated in frequency from the uplink resources by at least the first minimum frequency guard band, wherein the downlink resources and the uplink resources are located within a frequency band reserved for time division duplex (TDD) communications;

transmit an indication of the allocated downlink resources to the first UE;

transmit an indication of the allocated uplink resources to the second UE;

provide to the first UE and the second UE a group common downlink control information (GC-DCI) message indicating a change of downlink resources allocated for the first UE and a change of uplink resources allocated for the second UE, wherein the changed allocations accommodate the first minimum frequency guard band value; and transmit to the first UE an indication of a reference sub-carrier spacing (SCS) value for use in determining a minimum switching delay associated with the change of downlink BWP allocation, wherein the reference SCS is different from a SCS of the first UE.

15. The base station of claim 14, wherein the processing circuitry is configured to execute the software instructions to:

receiving an indication of a second minimum frequency guard band value for use between frequency resources associated with downlink communications between a first UE and the base station, and frequency resources associated with uplink communications between a second UE and the base station, wherein the first minimum frequency guard band value is for use when downlink communications for the first UE have a first set of characteristics, and wherein the second minimum guard band value is for use when downlink communications for the first UE have a second set of characteristics;

wherein allocating the downlink resources and the uplink resources separated in frequency by at least the first minimum frequency guard band is in response to determining that the downlink communications for the first UE have the first set of characteristics.

* * * * *

UNITED STATES PATENT AND TRADEMARK OFFICE
CERTIFICATE OF CORRECTION

| | | |
|---|---|---|
| PATENT NO. | : 12,446,016 B2 | Page 1 of 1 |
| APPLICATION NO. | : 17/949028 | |
| DATED | : October 14, 2025 | |
| INVENTOR(S) | : Seyed Ali Akbar Fakoorian et al. | |

It is certified that error appears in the above-identified patent and that said Letters Patent is hereby corrected as shown below:

In the Claims

Column 25, Line 40, delete "values; and" and insert --values;--.

Signed and Sealed this
Ninth Day of December, 2025

John A. Squires
*Director of the United States Patent and Trademark Office*